United States Patent
Kuo et al.

(10) Patent No.: US 11,259,211 B2
(45) Date of Patent: Feb. 22, 2022

(54) CHANNEL LOADING PRE-ADJUSTING SYSTEM FOR 5G WIRELESS COMMUNICATION

(71) Applicant: Alpha Networks Inc., Hsinchu (TW)

(72) Inventors: Yu-Hsin Kuo, Hsinchu (TW); Ren-Hao Chen, Hsinchu (TW); Po-Wen Tuan, Hsinchu (TW); Yan-Wei Liu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 25 days.

(21) Appl. No.: 16/720,744

(22) Filed: Dec. 19, 2019

(65) Prior Publication Data

US 2021/0160734 A1 May 27, 2021

(30) Foreign Application Priority Data

Nov. 22, 2019 (TW) ................. 108142433

(51) Int. Cl.
*H04W 28/08* (2009.01)
*H04W 28/22* (2009.01)
(Continued)

(52) U.S. Cl.
CPC ..... *H04W 28/085* (2013.01); *H04W 28/0284* (2013.01); *H04W 28/22* (2013.01); *H04W 48/06* (2013.01)

(58) Field of Classification Search
CPC .......... H04W 28/0284; H04W 28/085; H04W 28/22; H04W 48/06
See application file for complete search history.

(56) References Cited

U.S. PATENT DOCUMENTS

2003/0151513 A1* 8/2003 Herrmann ............ G08B 25/003
340/573.1
2004/0259547 A1* 12/2004 Lau ................... H04W 36/0058
455/436
(Continued)

FOREIGN PATENT DOCUMENTS

| CN | 1875603 | 12/2006 |
|---|---|---|
| CN | 106664745 | 5/2017 |

(Continued)

*Primary Examiner* — Khoa Huynh
(74) *Attorney, Agent, or Firm* — WPAT, PC

(57) ABSTRACT

A channel loading pre-adjusting system for 5G wireless communication adapted to be used for communicating at least one user's device with a core network includes a radio unit, a distributed unit in communication with the radio unit via a specified transmission channel, and a central unit. The distributed unit periodically detects transmission conditions of the specified channel and determines whether to issue an alarm signal accordingly, and in response to the alarm signal, the central unit determines whether to suspend data transmission via the specified transmission channel. The transmission conditions include a first group of latency parameters realized in a first number of consecutive detecting operations of the distributed unit and a temporal threshold derived from a second group of latency parameters realized in a second number of consecutive detecting operations of the distributed unit, and the first group of latency parameters are dynamically updated with time.

15 Claims, 2 Drawing Sheets

(51) Int. Cl.
*H04W 28/02* (2009.01)
*H04W 48/06* (2009.01)

(56) References Cited

U.S. PATENT DOCUMENTS

| | | |
|---|---|---|
| 2008/0134194 A1 | 6/2008 | Liu |
| 2011/0211465 A1* | 9/2011 | Farrugia ............... H04M 15/64 |
| | | 370/252 |
| 2015/0063802 A1 | 3/2015 | Bahadur et al. |
| 2017/0164236 A1 | 6/2017 | Boldi et al. |
| 2017/0332270 A1 | 11/2017 | Gandhi |
| 2018/0220345 A1* | 8/2018 | Moon .................. H04B 7/0695 |

FOREIGN PATENT DOCUMENTS

| | | |
|---|---|---|
| TW | 201212693 | 3/2012 |
| TW | 201817261 | 5/2018 |
| TW | 201909607 | 3/2019 |
| TW | I655870 | 4/2019 |

* cited by examiner

CHANNEL LOADING PRE-ADJUSTING SYSTEM FOR 5G WIRELESS COMMUNICATION

FIELD OF THE INVENTION

The present invention relates to a 5G wireless communication technology, and more particularly to a channel loading pre-adjusting system for 5G wireless communication.

BACKGROUND OF THE INVENTION

In the architecture of the 5th generation (5G) wireless communication system, each radio unit transmits signals to and receives signals from a corresponding distributed unit. Meanwhile, a plurality of distributed units are controlled and coordinated by a central unit. Generally, the network traffic of a fronthaul network, which is between the distributed unit and the central unit, is predetermined while the network is being deployed. However, the actual traffic occurring when the network is used is likely to deviate from the default amount. Therefore, in order to enable the network to operate normally, an appropriate and flexible mechanism for network load detection and adjustment becomes very important.

SUMMARY OF THE INVENTION

Therefore, the present invention provides a channel loading pre-adjusting system for 5G wireless communication, in which a transmission condition of a channel is monitored and a temporal threshold serving as a standard base is dynamically adjusted, thereby determining if an alternative channel is required based on the transmission condition and the current temporal threshold.

The present invention provides a channel loading pre-adjusting system for 5G wireless communication, adapted to be used for communicating at least one user's device with a core network, which comprises: a radio unit adapted to communicate with the at least one user's device for signal transmission; a distributed unit in communication with the radio unit via a specified transmission channel for signal transmission, the distributed unit performing baseband processing; and a central unit in communication with the distributed unit for signal transmission, the central unit being adapted to communicate with the core network for signal transmission. Transmission conditions of the specified transmission channel are periodically detected by the distributed unit, and the distributed unit determines whether to issue an alarm signal to the central unit or not according to the transmission conditions, and in response to the alarm signal, the central unit determines whether to suspend data transmission via the specified transmission channel or not. The transmission conditions include a first group of latency parameters realized in a first number of consecutive detecting operations of the distributed unit and a temporal threshold derived from a second group of latency parameters realized in a second number of consecutive detecting operations of the distributed unit, and the first group of latency parameters are dynamically updated with time.

In an embodiment, the first group of latency parameters include a plurality of entries of averaged latency, which are successively obtained in the first number of detecting operations, respectively, wherein each of the averaged latency is obtained by averaging a plurality of entries of latency respectively corresponding to a plurality of check packets issued in one of the first number of detecting operations, and each of the entries of latency is a time length from one time point that one of the check packets is issued by the distributed unit to another time point that a response to the one of the check packets is received by the distributed unit.

A period averaged latency is derived from the plurality of entries of averaged latency and compared with the temporal threshold by the distributed unit to determine whether the alarm signal is to be issued or not, wherein the period averaged latency is obtained by weighting each of the plurality of entries of averaged latency obtained in the first number of detecting operations and summing the weighted ones of averaged latency. The distributed unit issues the alarm signal when the period averaged latency is greater than the temporal threshold.

In an embodiment, the system further comprises one or more distributed units in communication with the radio unit and the central unit. The central unit determines whether to suspend data transmission via the specified transmission channel according to previously recorded period averaged latency data of all the distributed units in communication with the central unit. A new transmission channel is established between the radio unit and one of the other distributed units while the specified transmission channel is suspended.

In an embodiment, the second group of latency parameters include a plurality of entries of averaged latency, a plurality of entries of maximal latency, a plurality of entries of minimal latency and a plurality of entries of latency variation, which are successively obtained in the second number of detecting operations, respectively, wherein each of the averaged latency is obtained by averaging a plurality of entries of latency respectively corresponding to a plurality of check packets issued in one of the second number of detecting operations, and each of the entries of latency is a time length from one time point that one of the check packets is issued by the distributed unit to another time point that a response to the one of the check packets is received by the distributed unit; each of the plurality of entries of maximal latency is the maximal latency among the plurality of entries of latency respectively corresponding to the plurality of check packets issued in one of the second number of detecting operations; each of the plurality of entries of minimal latency is the minimal latency among the plurality of entries of latency respectively corresponding to the plurality of check packets issued in one of the second number of detecting operations; and each of the plurality of entries of latency variation is a difference between the maximal latency and the minimal latency in the same one of the second number of detecting operations. The temporal threshold is automatically selected from a threshold range defined with a minimum temporal threshold and a maximum temporal threshold, wherein the minimum temporal threshold is obtained by adding a period latency variation, which is the greatest one among the plurality of entries of latency variation, to the period averaged latency, and the maximum temporal threshold is a constant.

In an embodiment, the latency parameters in the first group are partially the same as the latency parameters in the second group, and the second group of latency parameters, as well as the first group of latency parameters, are dynamically updated with time. In an alternative embodiment, the second group of latency parameters do not change with time, and the temporal threshold is a constant.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
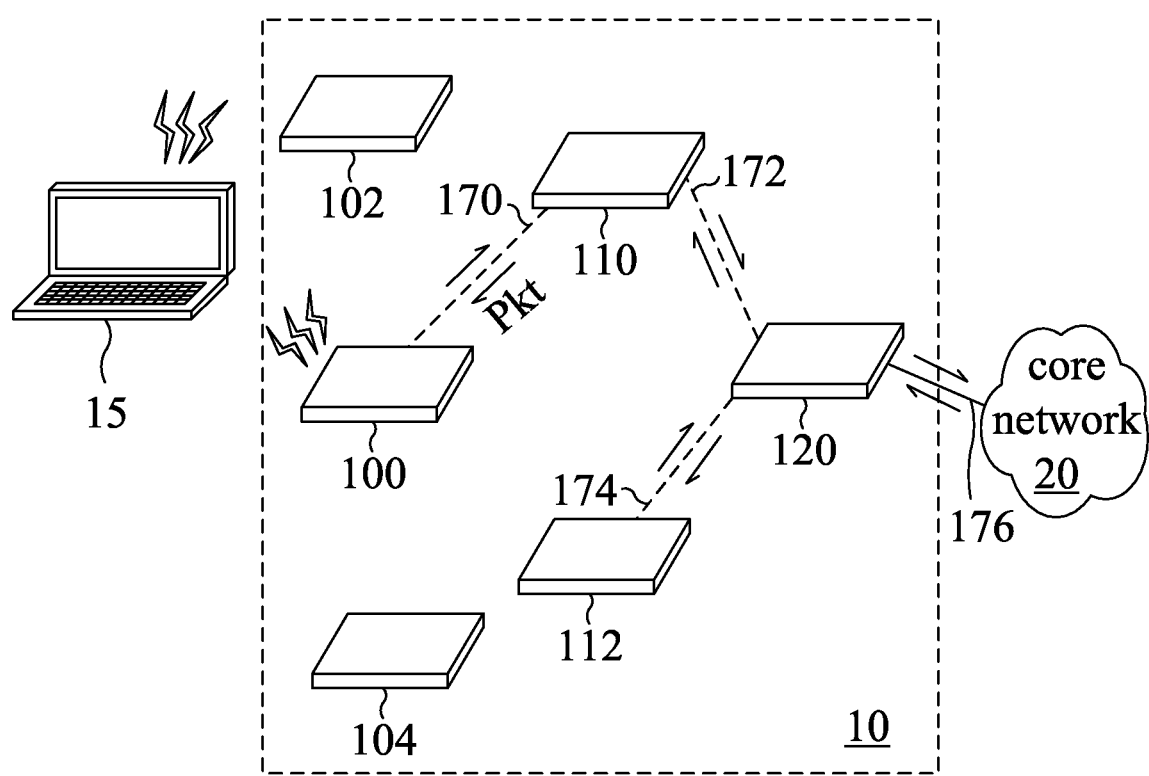
FIG. 1 is a scheme illustrating a channel loading pre-adjusting system for 5G wireless communication according to an embodiment of the present invention.

Please refer to FIG. 1. The architecture of a channel loading pre-adjusting system for 5G wireless communication according to an embodiment of the present invention is illustrated. As shown, the channel loading pre-adjusting system 10 includes a plurality of radio units, e.g. the units 100, 102 and 104, a plurality of distributed units, e.g. the units 110 and 112, and a central unit 120. The radio units 100, 102 and 104 are communicable with at least one external user's device, e.g. the device 15, for wireless signal transmission. The distributed units 110 and 112 communicate with the radio units 100, 102 and 104 via a fronthaul network for signal transmission. For example, a transmission channel 170 between the distributed unit 110 and the radio unit 100 is under a fronthaul network architecture. On the other hand, the central unit 120 communicates with the distributed units 110 and 112 via separate transmission channels 172 and 174, respectively, for signal transmission. Furthermore, the central unit 120 is communicable with an external core network 20 via a transmission channel 176.

The aforementioned radio units are the ones capable of transferring data in a wireless manner, processing radio frequency, and linking to corresponding distributed units through a network protocol interface. The distributed units 110 and 112 and the centralized unit 120 may be arranged in a group of servers. The distributed units 110 and 120 are a kind of logic units commonly used in the Next Generation Radio Access Network (NG-RAN), which can implement radio frequency processing functions and baseband processing functions such as Radio Link Control (RLC), Medium Access Control (MAC) and Physical Layer (PHY). The central unit 120 is also a kind of logic unit used in NG-RAN. It can be connected to the Next Generation Core (NGC) through the Next Generation (NG) interface, and it can control and coordinate the operation of the linked distributed units, including high-level control of the protocol stack and data functions. The main protocol layers involved include the radio resource control (RRC) layer at the control end, and the Internet Protocol (IP), the service data adaptation protocol (SDAP) and the Packet Data Convergence Protocol (PDCP) at the user end.

It is to be noted that the numbers of radio units, distributed units and central unit are for illustration only and may be designed according to practical requirements.

In order to enable those skilled in the art to clearly understand the logic relationship of the operations among the elements in the system according to the present invention, the channel load pre-adjusting system proposed by the present invention will be described in detail in conjunction with a flow diagram as follows. Please refer to FIG. 1 in combination with FIG. 2 for better understanding. It is to be understood that in the flow diagram illustrated in FIG. 2, Steps S200 through S230, Steps S240 through S250 and Steps S260 through S270 are illustrated in sequence. However, the three sets of steps may be executed in different orders depending on practical requirements, which will be described in more detail later.

Figure 2:
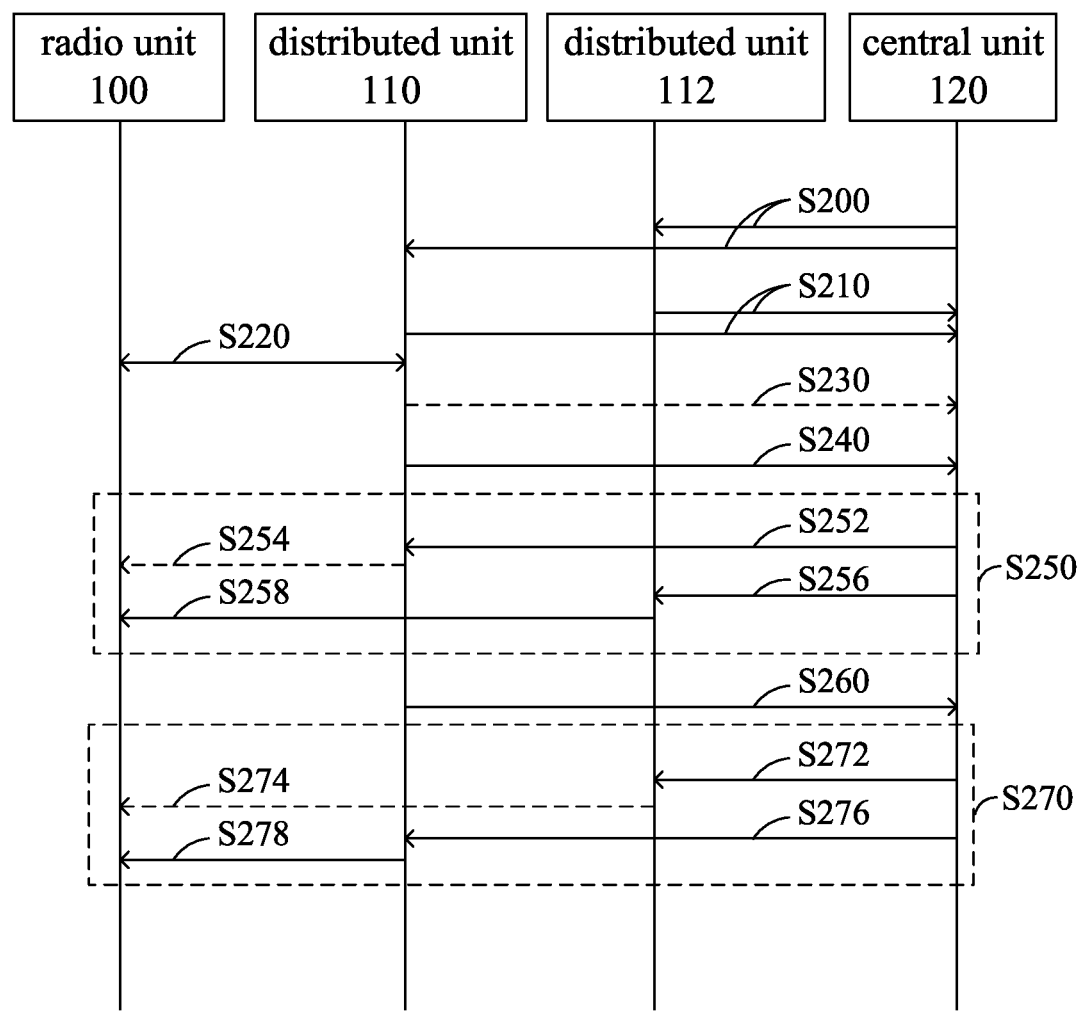
FIG. 2 is a flow diagram schematically illustrating a channel loading pre-adjusting system for 5G wireless communication according to an embodiment of the present invention.

In the embodiment illustrated in FIG. 2, one of the distributed units, e.g. the unit 110, periodically detects a transmission condition of one of the transmission channels, e.g. the channel 170, and determines whether an alarm signal is to be issued for changing the transmission channel or not according to the detecting results.

When the channel load pre-adjustment system 10 starts to operate, the central unit 120 performs corresponding configuration settings on the distributed units 110 and 112 in communication therewith (Step S200). These configuration settings include parameters regarding default services, and furthermore, parameters required for detection of transmission conditions of transmission channels. Herein, the transmission channel 170 communicating the distributed unit 110 and the radio unit 100 is taken as an example for illustrating the detecting operations. First of all, the central unit 120 issues a setting signal to the distributed unit 110 to set an interval between two detecting operations of the distributed unit 110 for periodically detecting transmission conditions of the specified channel. It is to be noted that for different distributed units, the intervals between respective two detecting operations thereof may be different, and the interval may be determined according to practical requirements. Subsequently, the distributed unit 110 responds to the central unit 120 for the configuration settings (Step S210).

Subsequently, under the link between the distributed unit 110 and the radio unit 100, the distributed unit 110 periodically detects transmission conditions of the transmission channel 170 to determine whether transmission delay occurs (Step S220). In more detail, whenever the distributed unit 110 performs one detecting operation of the transmission condition of the transmission channel 170, two or more check packets Pkt are issued from the distributed unit 110 to the radio unit 100. For each check packet Pkt, a time length from the time point that the packet is issued to the time point that a response to the packet is received is defined as a latency Td. The distributed unit 110 collects the plural entries of latency Td successively obtained for all the check packets Pkt issued in that detecting operation, calculates an averaged latency Td_avg of the plural entries of latency Td, picks up a maximal latency Td_max and a minimal latency Td_min, and calculates a latency variation $\Delta$Td, which is obtained by subtracting Td_max with Td_min. In conclusion, the parameters obtained in each detecting operation of the distributed unit 110 for determining the transmission condition of the transmission channel 170 include an averaged latency Td_avg, a maximal latency Td_max, a minimal latency Td_min and a latency variation $\Delta$Td.

The distributed unit 110 further processes the above-described parameters respectively obtained in a series of detecting operations for the transmission channel 170 in Step S220. The count of detecting operations may be preset according to practical requirements. For example, the distributed unit 110 weights each of the entries of averaged latency Td_avg obtained in the series of detecting operations for the transmission channel 170 and sums the weighted ones of averaged latency Td_avg to obtain a period averaged latency Td_wavg. The distributed unit 110 further defines the greatest one among the entries of latency variation $\Delta$Td obtained in the series of detecting operations for the transmission channel 170 as a period latency variation $\Delta$Td_max.

Hereinafter, two embodiments respectively exemplifying how the period latency variation $\Delta Td\_max$ obtained from the above-described parameters in the series of detecting operations of the distributed unit 110 is used for determining the transmission conditions of the transmission channel 170 will be described.

In a first embodiment, the period averaged latency $Td\_wavg$ and the period latency variation $\Delta Td\_max$ are added to define a minimum temporal threshold $Set\_min$. Once the minimum temporal threshold $Set\_min$ is determined in Step S220, the distributed unit 110 automatically generates a threshold range, which is defined with the minimum temporal threshold $Set\_min$ and a default maximum temporal threshold. Then, a threshold value within the threshold range is selected randomly or according to a specified algorithm, e.g. an averaging operation of the minimum temporal threshold $Set\_min$ and the default maximum temporal threshold, to serve as a temporal threshold for the transmission channel 170. For example, n consecutive detecting operations, e.g. the $m^{th}$ through the $(m+n)^{th}$ detecting operations, of the distributed unit 110 for the transmission channel 170 are performed, and the resulting parameters of averaged latency $Td\_avg$, maximal latency $Td\_max$, minimal latency $Td\_min$ and latency variation $\Delta Td$ are used to determine the period averaged latency $Td\_wavg\_m$ and the minimum temporal threshold $Set\_min\_m$. Within the threshold range defined with the minimum temporal threshold $Set\_min\_m$ and a default maximum temporal threshold, a temporal threshold $Tm$ is selected according to design requirements. Likewise, n consecutive detecting operations from the $(m+1)^{th}$ through the $(m+n+1)^{th}$ detecting operations of the distributed unit 110 for the transmission channel 170 are performed, and the resulting parameters of averaged latency $Td\_avg$, maximal latency $Td\_max$, minimal latency $Td\_min$ and latency variation $\Delta Td$ are used to determine the period averaged latency $Td\_wavg\_m+1$ and the minimum temporal threshold $Set\_min\_m+1$. Within the threshold range defined with the minimum temporal threshold $Set\_min\_m+1$ and a default maximum temporal threshold, a temporal threshold $Tm+1$ is selected according to design requirements.

The period averaged latency $Td\_wavg$ updated over time is then compared with the previously determined temporal threshold to estimate the current transmission condition of the transmission channel 170. That is, the period averaged latency $Td\_wavg\_m+1$ is compared with the temporal threshold $Tm$, and the distributed unit 110 will issue an alarm signal to the central unit 120 if the period averaged latency $Td\_wavg\_m+1$ is longer than the temporal threshold $Tm$. Likewise, the period averaged latency $Td\_wavg\_m+2$ is compared with the temporal threshold $Tm+1$, the period averaged latency $Td\_wavg\_m+3$ is compared with the temporal threshold $Tm+2$, and so on.

In a second embodiment, the distributed unit 110 may preset a period of time, e.g. three seconds, for determining the minimum temporal threshold $Set\_min$ by way of the above-described operations. Alternatively, the minimum temporal threshold $Set\_min$ may be determined after a few detecting operations, e.g. five consecutive detecting operations, are performed. Then the threshold range is defined, and the temporal threshold is obtained in a manner as described above. Afterwards, each the period averaged latency $Td\_wavg$ updated over time is compared with the constant temporal threshold to estimate the current transmission condition of the transmission channel 170. Whether an alarm signal is to be issued to the central unit 120 or not is determined according to the comparing results.

In either the first embodiment or the second embodiment, the transmission condition of the specified transmission channel can be estimated once two consecutive detecting operations are performed and two consecutive entries of period averaged latency $Td\_wavg$ are realized. For example, after the distributed unit 110 realizes the period averaged latency $Td\_wavg\_m$ and the period averaged latency $Td\_wavg\_m+1$, whether the period averaged latency varies too much or not is determined (Step S230). If the variation from the period averaged latency $Td\_wavg\_m$ to the period averaged latency $Td\_wavg\_m+1$ exceeds a corresponding threshold, it means that the transmission environment associated with the distributed unit 110 changes significantly, so the data of later period averaged latency $Td\_wavg\_m+1$ is transferred to the central unit 120 to be recorded for further operations (Step S240).

In an embodiment, the above-mentioned threshold for determining great or small transmission variation correlates to the ratio of the period averaged latency $Td\_wavg\_m+1$ to the period averaged latency $Td\_wavg\_m$. For example, the threshold is 10 times as much as the period averaged latency $Td\_wavg\_m$. In other words, if the period averaged latency $Td\_wavg\_m+1$ is greater than 10 times as much as the period averaged latency $Td\_wavg\_m$, it exceeds the threshold, and the data of the period averaged latency $Td\_wavg\_m+1$ is transferred to the central unit 120. It is understood that the threshold can be set according to practical requirements. For example, the threshold may be set to be 100 times or any other suitable value as much as the preceding period averaged latency.

The central unit 120, after receiving the alarm signal, determines whether the transmission channel 170 continues to be used for data transmission or not based on some further factors. If it is determined by the central unit 120 to suspend the data transmission via the transmission channel 170, the central unit 120 issues a control signal to the distributed unit 110 (Step S252) and the distributed unit 112 (Step S256) to have them performing a handover procedure. Accordingly, the data transmission via the transmission channel 170 is interrupted (Step S254), and a new transmission channel between the distributed unit 112 and the radio unit 100 is established in lieu of the transmission channel 170 between the distributed unit 110 and the radio unit 100 (Step S258). The above-mentioned factors referred to by the central unit 120 to discriminate whether the transmission channel 170 continues to be used for data transmission or not may include the data of the period averaged latency $Td\_wavg$ of all the distributed units in communication with the central unit 120. For example, if there exists any suitable period averaged latency $Td\_wavg$, the one or a smaller one, and preferably the smallest one, will be used for establishing the new transmission channel.

In this embodiment, in spite the data transmission via the transmission channel 170 is suspended, the distributed unit 110 keeps on monitoring the transmission channel 170. Once the updated period averaged latency $Td\_wavg$ associated with the transmission channel 170 becomes lower than the temporal threshold, the distributed unit 110 sending a notification to the central unit 120 (Step S260), and then the central unit 120 makes another judgement about whether to recover the data transmission via the transmission channel 170 or not based on the notification and the previously recorded data of the period averaged latency $Td\_wavg$ of all the distributed units in communication therewith. If positive, the central unit 120 issues a control signal to the distributed unit 112 (Step S272) and the distributed unit 110 (Step 276) to have them performing a handover procedure. Accordingly, the data transmission via the transmission channel between the distributed unit 112 and the radio unit 100 is interrupted (Step S274), and the data transmission via the transmission channel 170 between the distributed unit 110 and the radio unit 100 is restored (Step S278).

In view of the foregoing, a channel loading pre-adjusting system for 5G wireless communication according to the present invention is capable of adaptively using a transmission channel for data transmission by periodically detecting the transmission conditions of the transmission channel. The transmission condition in the above embodiments is evaluated with a period averaged latency $Td\_wavg$ associated with a specified transmission channel. Nevertheless, modification of the period averaged latency $Td\_wavg$ and/or additional factor(s) may also be used for evaluation according to practical requirements. If the transmission condition indicates a data transmission problem via the specified transmission channel, optional adjustment such as replacement of transmission channel can be timely made so as to avoid a serious situation. The timing to make adjustment, for example, may refer to the previously recorded data of the period averaged latency $Td\_wavg$, which are obtained successively in a series of detecting operations. Since the detection and adjustment are dynamically executed, it is adapted to be used in a wireless communication system that likely changes over time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A channel loading pre-adjusting system for use in a fronthaul network of next generation radio access network (NG-RAN), adapted to be used for communicating at least one user's device with a core network, and comprising:
    a radio unit in the fronthaul network, adapted to communicate with the at least one user's device for signal transmission in a wireless manner, the radio unit performing radio-frequency processing;
    a distributed unit in the fronthaul network, in communication with the radio unit via a specified transmission channel for signal transmission, the distributed unit performing baseband processing; and
    a central unit in the fronthaul network, in communication with the distributed unit for signal transmission, the distributed unit being adapted to communicate with the core network for signal transmission, and controlling and coordinating operations of the distributed unit,
    wherein the distributed unit periodically detects transmission conditions of the specified transmission channel and issues an alarm signal to the central unit for transmission channel adjustment
    when a period averaged latency of a first group of latency parameters realized in a first number of consecutive detecting operations of the distributed unit for the specified transmission channel is greater than a temporal threshold derived from a second group of latency parameters realized in a second number of consecutive detecting operations of the distributed unit for the specified transmission channel, wherein the first group of latency parameters are dynamically updated with time.

2. The system according to claim 1, wherein the first group of latency parameters include a plurality of entries of averaged latency, which are successively obtained in the first number of detecting operations, respectively, wherein each of the averaged latency is obtained by averaging a plurality of entries of latency respectively corresponding to a plurality of check packets issued in one of the first number of detecting operations, and each of the entries of latency is a time length from one time point that one of the check packets is issued by the distributed unit to another time point that a response to the one of the check packets is received by the distributed unit.

3. The system according to claim 2, wherein the period averaged latency is obtained by weighting each of the plurality of entries of averaged latency obtained in the first number of detecting operations and summing the weighted ones of averaged latency.

4. The system according to claim 1, further comprising one or more distributed units in communication with the radio unit and the central unit for signal transmission via respective transmission channels.

5. The system according to claim 4, wherein a new transmission channel is established between the radio unit and one of the other distributed units while the specified transmission channel is suspended.

6. The system according to claim 3, wherein the central unit records a period averaged latency which is greater than the preceding period averaged latency to a certain degree.

7. The system according to claim 6, wherein the central unit records the period averaged latency which is greater than a multiple of the preceding period averaged latency.

8. The system according to claim 3, wherein the second group of latency parameters include a plurality of entries of averaged latency, a plurality of entries of maximal latency, a plurality of entries of minimal latency and a plurality of entries of latency variation, which are successively obtained in the second number of detecting operations, respectively, wherein each of the averaged latency is obtained by averaging a plurality of entries of latency respectively corresponding to a plurality of check packets issued in one of the second number of detecting operations, and each of the entries of latency is a time length from one time point that one of the check packets is issued by the distributed unit to another time point that a response to the one of the check packets is received by the distributed unit; each of the plurality of entries of maximal latency is the maximal latency among the plurality of entries of latency respectively corresponding to the plurality of check packets issued in one of the second number of detecting operations; each of the plurality of entries of minimal latency is the minimal latency among the plurality of entries of latency respectively corresponding to the plurality of check packets issued in one of the second number of detecting operations; and each of the plurality of entries of latency variation is a difference between the maximal latency and the minimal latency in the same one of the second number of detecting operations.

9. The system according to claim 8, wherein the temporal threshold is automatically selected from a threshold range defined with a minimum temporal threshold and a maximum temporal threshold, wherein the minimum temporal threshold is obtained by adding a period latency variation, which is the greatest one among the plurality of entries of latency variation, to the period averaged latency.

10. The system according to claim 9, wherein the maximum temporal threshold is a constant.

11. The system according to claim 1, wherein the first number is equal to the second number.

12. The system according to claim 1, wherein the first number is not equal to the second number.

13. The system according to claim 1, wherein the latency parameters in the first group are partially the same as the latency parameters in the second group, and the second group of latency parameters, as well as the first group of latency parameters, are dynamically updated with time.

14. The system according to claim 13, wherein the first group of latency parameters include the latency parameters obtained from the $(m+1)^{th}$ detecting operation to the $(m+n+1)^{th}$ detecting operation, and the second group of latency parameters include the latency parameters obtained from the $m^{th}$ detecting operation to the $(m+n)^{th}$ detecting operation, wherein (m+1), (m+n+1), m and (m+n) are numbers indicating orders of the detecting operations, respectively.

15. The system according to claim 1, wherein the second group of latency parameters do not change with time, and the temporal threshold is a constant.

\* \* \* \* \*